US006547323B1

(12) United States Patent
Aitken et al.

(10) Patent No.: US 6,547,323 B1
(45) Date of Patent: Apr. 15, 2003

(54) FOLDING SEAT PART WITH INTEGRATED TABLE (75) Inventors: Thomas Aitken, Holland, MI (US); Michael Snook, Worcester (GB)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/620,450

(22) Filed: Jul. 20, 2000

(30) Foreign Application Priority Data

Jul. 23, 1999 (DE) ..................................... 299 12 877 U (51) Int. Cl.[7] .............................................. A47C 13/00
(52) U.S. Cl. .................. 297/113; 297/146; 297/411.32; 297/188.04; 108/44
(58) Field of Search ................................ 297/112, 113, 297/114, 145, 188.01, 188.14, 188.16, 188.19, 411.2, 411.31, 411.32, 188.04, 188.05, 188.17, 146; 108/44, 66, 77, 78

(56) References Cited

U.S. PATENT DOCUMENTS 1,802,620 A    4/1931   Scully
4,533,175 A  * 8/1985   Brennan ................. 297/113 X
5,150,946 A  * 9/1992   Marfilius et al. ....... 297/113 X
5,628,543 A  * 5/1997   Filipovich et al. ......... 297/113
5,788,324 A  * 8/1998   Shea et al. .................. 297/113
5,848,820 A  * 12/1998  Hecht et al. ............ 297/113 X
6,217,112 B1 * 4/2001   Linsenmeier et al. ....... 297/113
6,220,660 B1 * 4/2001   Bedro et al. ............ 297/113 X

FOREIGN PATENT DOCUMENTS

| DE | 1630540 | 4/1971 |
| DE | 4125783 | 2/1993 |
| DE | 4343242 | 6/1995 |
| EP | 0751037 | 1/1997 |
| GB | 1151940 | 5/1969 |

OTHER PUBLICATIONS

European Search Report dated Feb. 1, 2000.

* cited by examiner

Primary Examiner—Peter M. Cuomo
Assistant Examiner—Stephen Vu
(74) Attorney, Agent, or Firm—Foley & Lardner (57) ABSTRACT A folding seat part of a motor vehicle seat including an integrated table with a base and a tabletop. The tabletop includes a center leaf and at least one side leaf hinged to the center leaf. The tabletop is mounted to the base for rotational movement such that its rotational movement causes the side leaf to lock in a horizontal plane with the center leaf.

20 Claims, 8 Drawing Sheets

FOLDING SEAT PART WITH INTEGRATED TABLE

TECHNICAL FIELD OF THE INVENTION

The invention generally relates to a folding seat part for a vehicle. More specifically, the invention relates to a folding seat part with an integrated table.

BACKGROUND AND SUMMARY OF THE INVENTION

It is the objective of the invention to improve, with small structural expenses, a folding seat part to increase the comfort of the occupants. In accordance with the invention, this is achieved by an integrated table with a base and with a tabletop, which features a center leaf and, for increasing the table area, at least one side leaf, which is swivel-mounted on the center leaf and is mounted so that it can be rotated relative to the base in such a manner that its rotation causes the side leaf to lock in a horizontal plane with the center leaf, whereby the center leaf and side leaf each locally rest on the base.

The table of the folding seat part in accordance with the invention can advantageously be folded in to a stored position or folded out to a deployed position as needed. In the deployed position, in which the center and side leafs form the tabletop and have been rotated relative to the base, a large and stable table area is achieved. In the stored position, the table takes up little space. Only a few components are needed and only small structural expense is required to ensure that the table folds open in a certain manner and rotates itself around a central point to stabilize in a horizontal position.

In a preferred embodiment, the folding seat part acts as an armrest, specifically as a center armrest of a rear seat bench in a vehicle.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

The same parts are always given the same reference numbers in the different figures of the drawing and therefore, as a rule, will only be described once.

Figure 1:
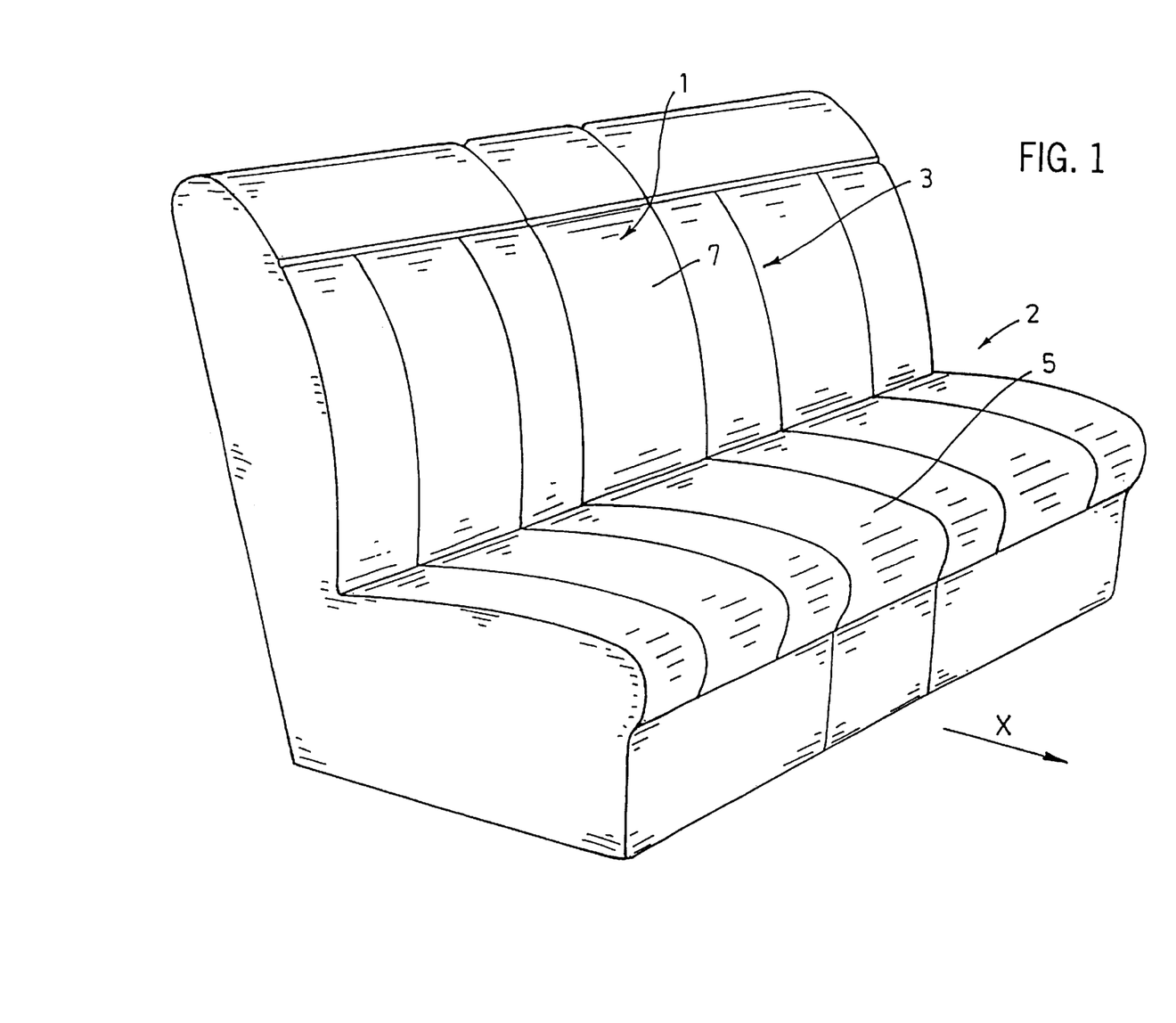
FIG. 1 is a perspective view of the folding seat part in accordance with the invention, shown installed as a center armrest and folded into the stored position.

As shown in FIG. 1, the embodiment of a folding seat part 1 in accordance with the invention deals with a central arm rest, which is located on a rear seat bench 2 of a motor vehicle and within the backrest 3 of the rear seat bench 2. The center armrest forms a face with the backrest 3 and the longitudinal axis of the seat part 1. The seat part 1, which is not illustrated in detail, has an ergonomically conditioned tilt against the direction of motion X and is arranged approximately vertical.

Figure 2:
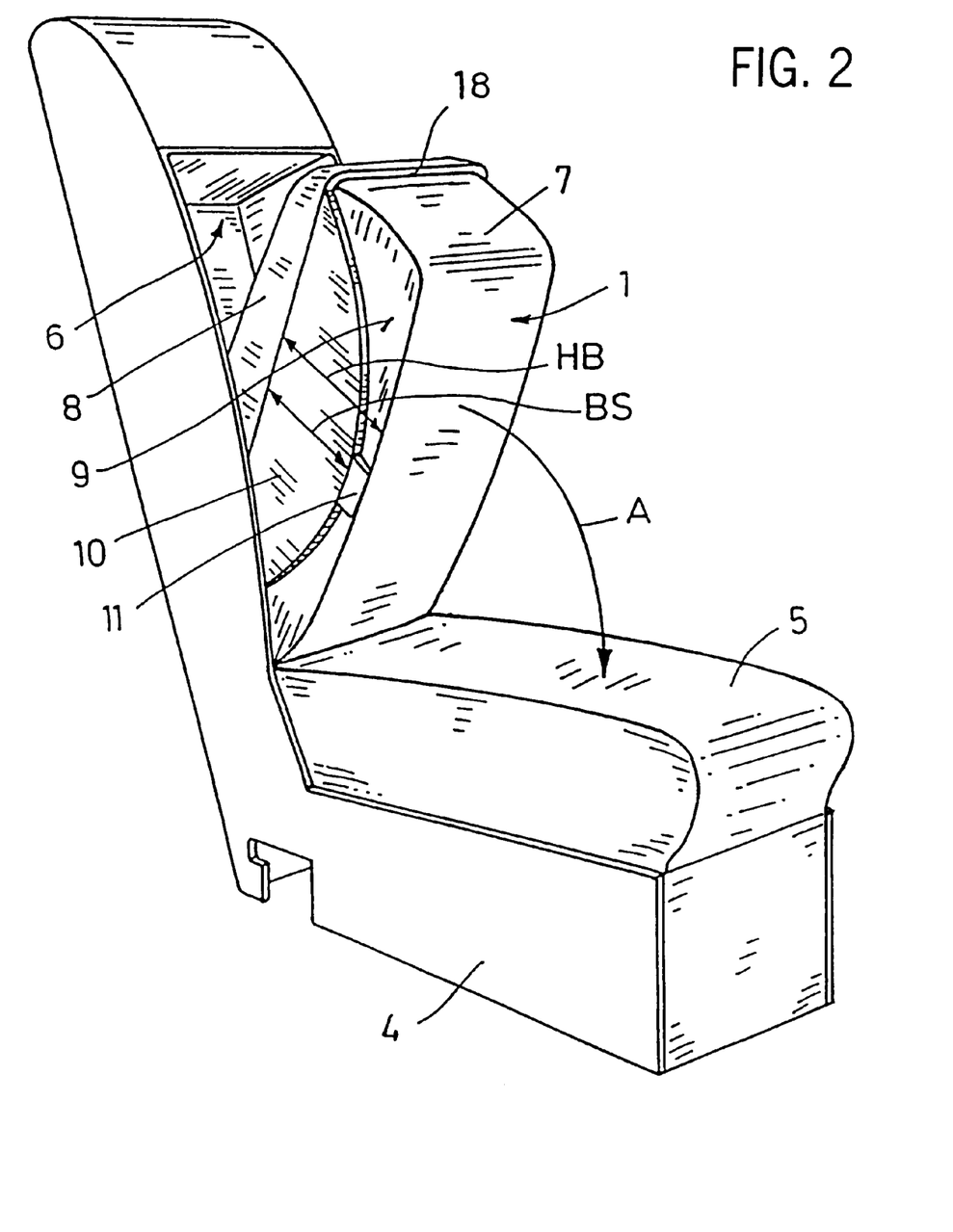
FIG. 2 is a perspective view of the folding seat part in accordance with the invention, shown in a transition position.

As shown in FIG. 2, the folding seat part 1 in accordance with the invention, together with a frame structure 4, which forms a support for a seat bolster 5 and a recess cavity 6 for the armrest, can be designed as a seat module in accordance with the invention that can be mounted into the rear seat bench 2 as a whole.

The folding seat part 1 in accordance with the invention may be transitioned in the direction of arrow A from its common face with the backrest 3 of the rear seat bench 2 out from the recess cavity 6 of the frame structure 4. The swiveling axis runs straight through the lower portion of the recess cavity 6 near the seat bolster 5.

The seat part 1 in accordance with the invention has a multi-pieced design. The seat part 1 preferably includes a base 7 with, apart from the ergonomically advantageous curves, the basic shape of a rectangular parallelepiped, a covering 8 located on top of the base 7, and a side leaf 10, which is adjacent to the side panel 9 of the base 7 and is shaped as a circular section.

A width BS of the side leaf 10 corresponds approximately to the height HB of the side panel 9 of the base 7. This dimensioning enables the table area, to be expanded with the participation of the side leaf 10, to be maximally enlarged on the one hand, and the side leaf to be well accommodated within the recess cavity 6 on the other hand. A holding device 11 that is easy to release, such as a snapping or locking device, can advantageously fasten the side leaf 10 to the side of the base 7.

Figure 3:
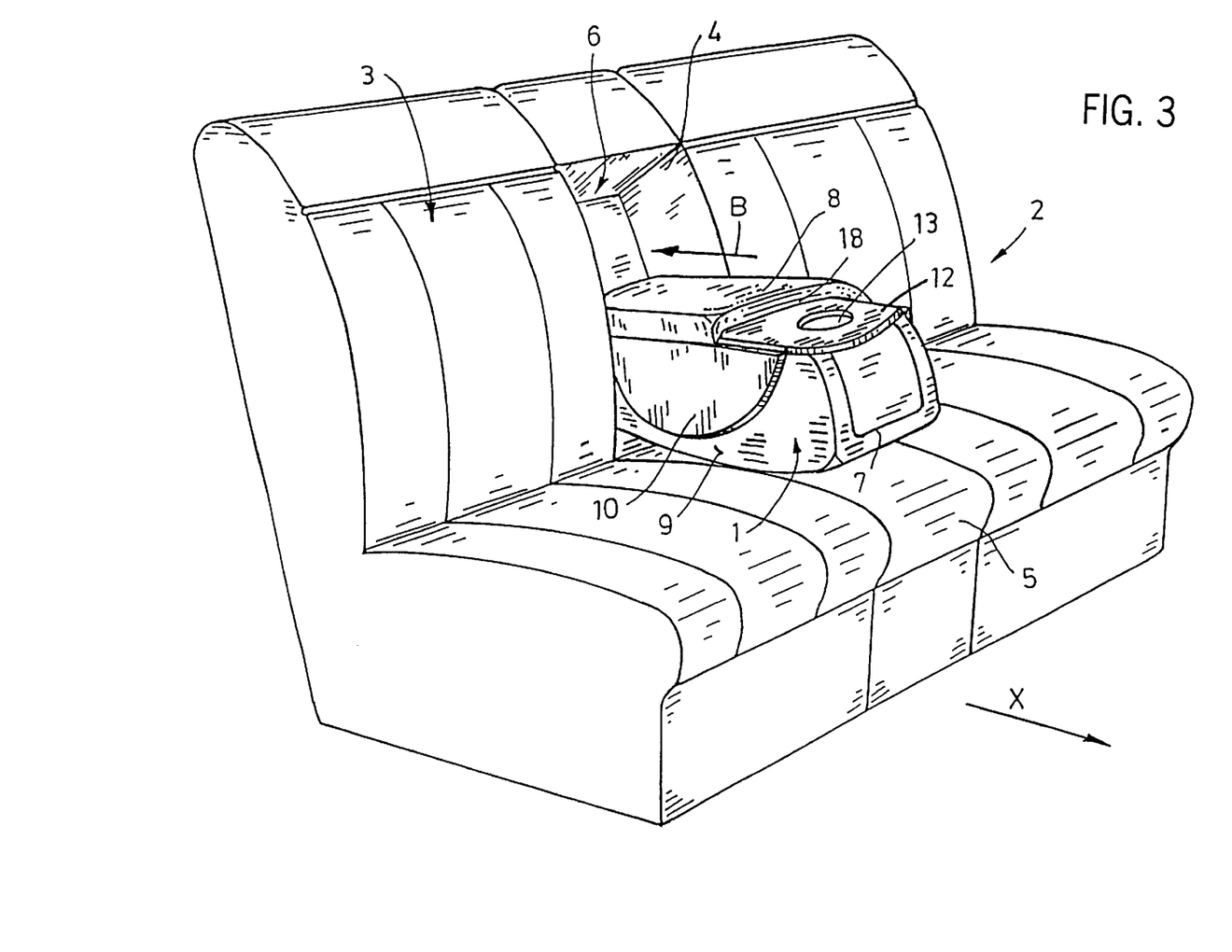
FIG. 3 is a perspective view of the folding seat part in accordance with the invention, shown folded into the deployed position and in the first phase for preparing the integrated table for use.

As shown in FIG. 3, the folding seat part 1 in accordance with the invention, which is now in its deployed position, rests on the seat bolster 5 and the longitudinal axis of the seat part 1. As a first phase in preparing the integrated table for use, the covering 8 for the base 7 can be shifted relative to the base 7. When shifted in the direction of arrow B (opposite the direction of motion X), a part labeled 12, which is arranged on top of the base 7, is exposed. This part deals with a center leaf 12 of the table integrated in the seat part 1 in accordance with the invention. The center leaf 12 and the two side leafs 10, which are connected to swing with the center leaf 12, form the tabletop when it is in its service position. The tabletop can be designed in an ergonomically optimal adaptation to the space available, preferably circular. In a preferred embodiment, the tabletop can feature at least one recess or retaining hole 13 for containers, such as beverage cans, glasses, or plates, whereby these can be secured against tipping over or sliding. Retaining holes 13 for cups can also be present in the side leafs 10.

Figures 4, 5:
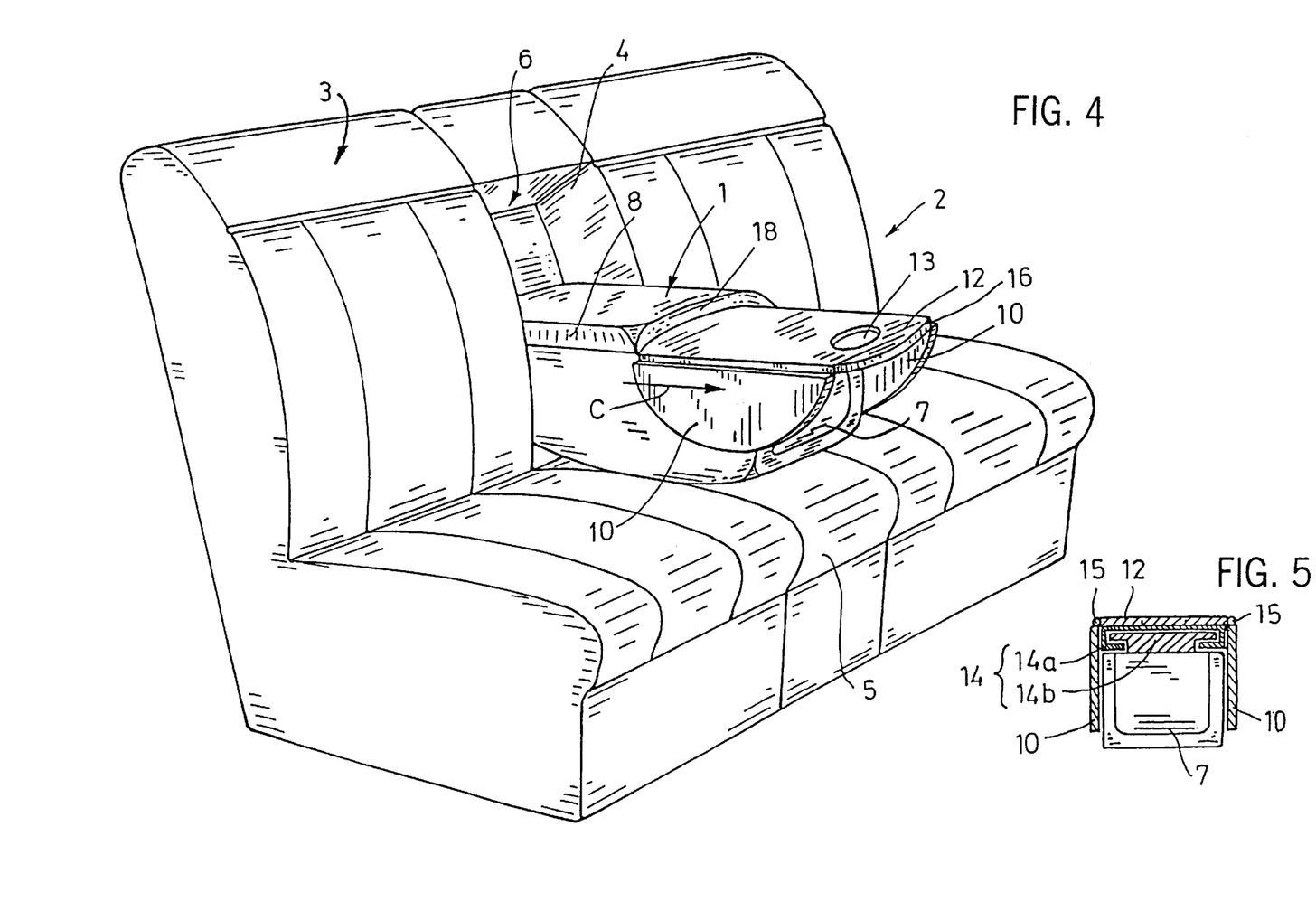
FIG. 4 is a perspective view of the folding seat part in accordance with the invention, shown folded into the deployed position and in the second phase for preparing the integrated table for use.
FIG. 5 is a frontal view of the folding seat part in accordance with the invention.

As shown in FIG. 4, the base 7 can advantageously feature a linear guide 14 for the integrated tabletop, especially for the center leaf 12 (in the direction of its longitudinal axis). The linear guide 14 can, for example, be implemented like a dovetail.

As shown in FIG. 5, the linear guide 14 can consist of two positively interlocking guide rails 14a, 14b, which engage each other. The guide rail 14a, which has a U-shaped cross section with the sides of the U being bent inwards, is fastened to or designed on the center leaf 12. The guide rail 14b, which has a T-shaped cross section, is fastened to or designed on the base 7. The center leaf 12, which is connected to the two side leafs 10 by joints 15, can be pulled within the linear guide 14 in the direction of arrow C (in the direction of motion X), whereby the table can preferably be arranged into its service position at a greater distance from the backrest 3, and its table area is more accessible to the vehicle occupants. The tabletop can feature a handle 16 on the center leaf 12, as shown in FIG. 4, to make it easier to pull out. The table integrated in seat part 1 in accordance with the invention can preferably feature two side leafs 10, arranged approximately congruently and symmetrically.

Figure 6:
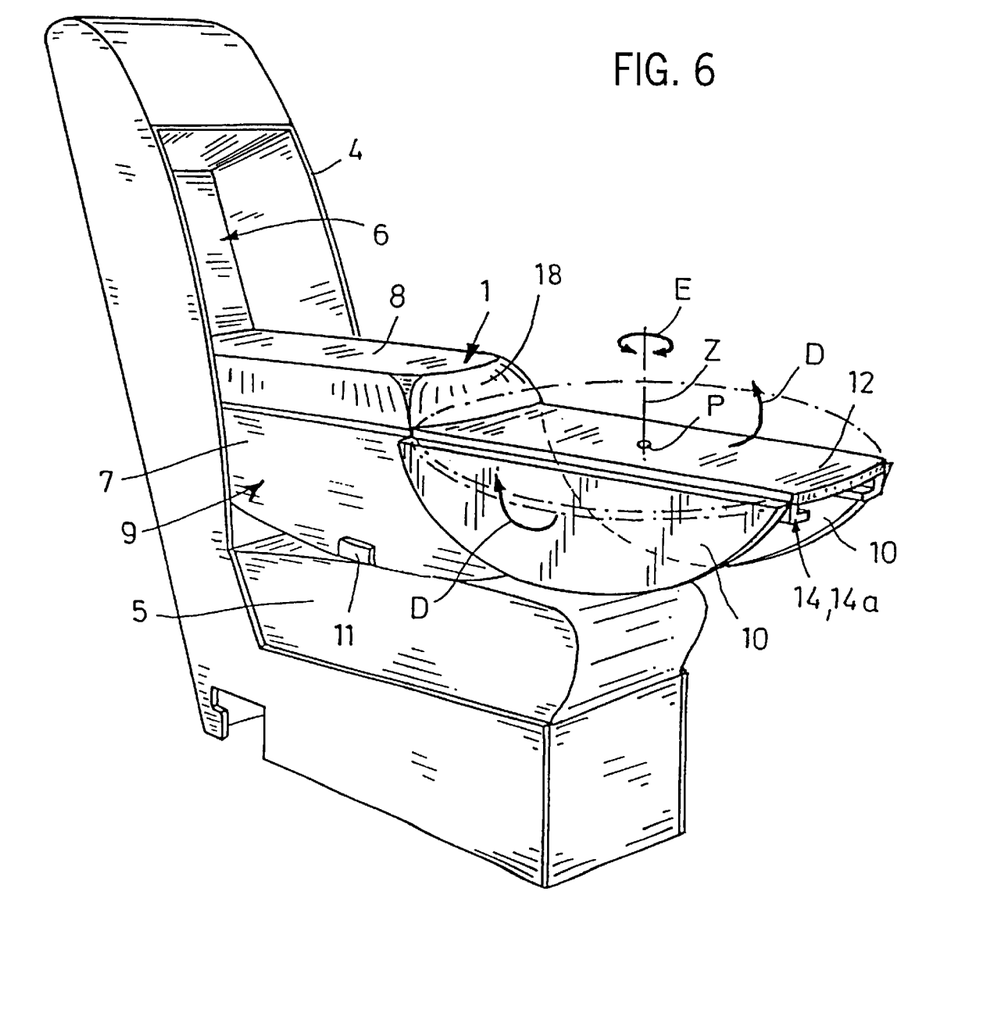
FIG. 6 is a perspective view of the folding seat part in accordance with the invention, shown folded into the deployed position and in the third phase for preparing the integrated table for use.

As shown in FIG. 6, the two side leafs 10 for enlarging the table area are swivelmounted on the center leaf 12, as mentioned previously, so that they can be swung in the direction of arrow D, out of the position in which they rest on the side panel 9 of the base 7, into a position in which they form a horizontal plane with the center leaf 12, i.e. form the table area (shown with dotted and dashed lines). The tabletop(s) (primarily the side leafs 10) can consist of a thin material in particular that takes up little space when packed under the covering 8 and folded down to the sides 9 of the base 7.

The center leaf 12 together with the side leafs 10, which are located on and aligned horizontally with the center leaf 12, are mounted to rotate in the direction of arrow E relative to the base 7 around a vertical axis Z, which runs through the center bearing point P, in such a manner that the rotation causes the side leafs 10 to lock in the horizontal plane, whereby the center leaf 12 and side leaf 10 each locally rest on the base 7. This rotation achieves the stable service position, as shown in FIG. 7.

To achieve an optimal high stability with the side leaf 10 and the center leaf 12 in the locked position, a joint 17, which runs between each of them, can be aligned at an angle of approximately 45° to the longitudinal axis of the base 7 and the seat part. The side leafs 10 and the center leaf 12 can furthermore be dimensioned so that, when the side leaf 10 and the center leaf 12 are in their locked position, the joints 17 running between them rest on the base 7 for approximately one third, preferably about one half, their length.

Figure 7:
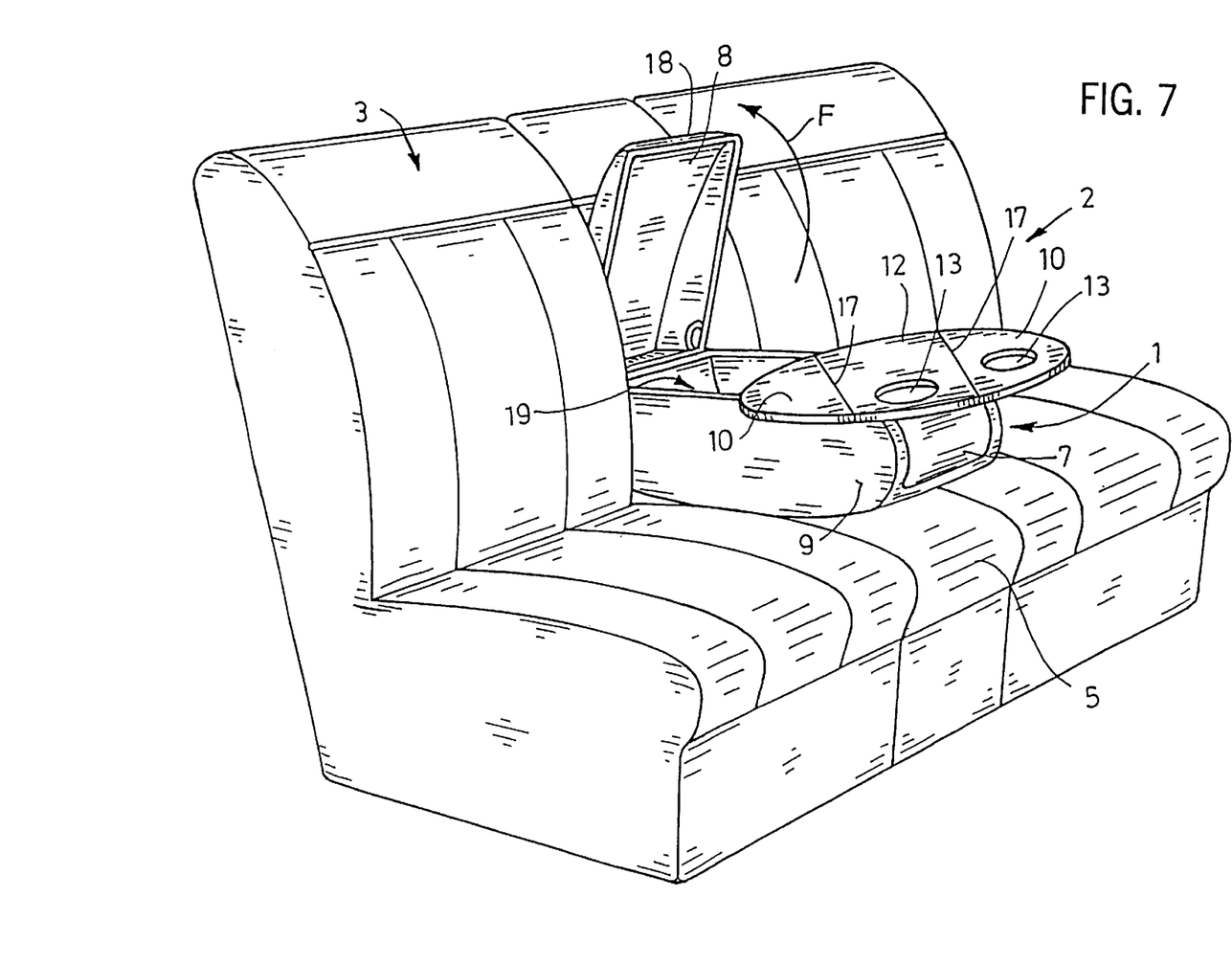
FIG. 7 is a perspective view of the folding seat part, including the integrated table, completey prepared for use.

As shown in FIG. 7, the covering 8 can not only be mounted to shift relative to the base 7, but preferably also to swing in the direction of arrow F at the same time. This swinging moves the front edge 18 of the covering 8, which faces the table when it is in its service position, upwards and back (opposite the direction of motion X). The covering 8 can also advantageously be fixed. The base 7 can advantageously be designed as a part that is open and hollow on top, whereby it becomes possible to store objects in an accommodation space 19 of the seat part 1 in accordance with the invention.

In summary, the table can be brought into its service position as follows: after the seat part (the backrest) in accordance with the invention has been folded out, the covering 8 slides back, exposing the upper surface of the center leaf 12. The tabletop (center leaf 12 with swinging side leafs 10) slides out, folds upon itself and turns around a central bearing point P, whereby the side leafs 10 become stabilized in a horizontal state. This rotational stabilization of the table is secure, operates with few components, and thus only requires small structural expense. The table that is integrated in the seat part 1 in accordance with the invention offers greater comfort within a motor vehicle.

As shown in FIG. 2, the seat part 1 in accordance with the invention does not necessarily have to be designed as an armrest in the rear seat bench 2 of a motor vehicle, but that, given an appropriate width of the frame structure 4, the seat module in accordance with the invention can also be designed as a separate seat. This separate seat has adequate room for one person, whereby the seat part 1 in accordance with the invention forms its seat back.

Figure 8A:
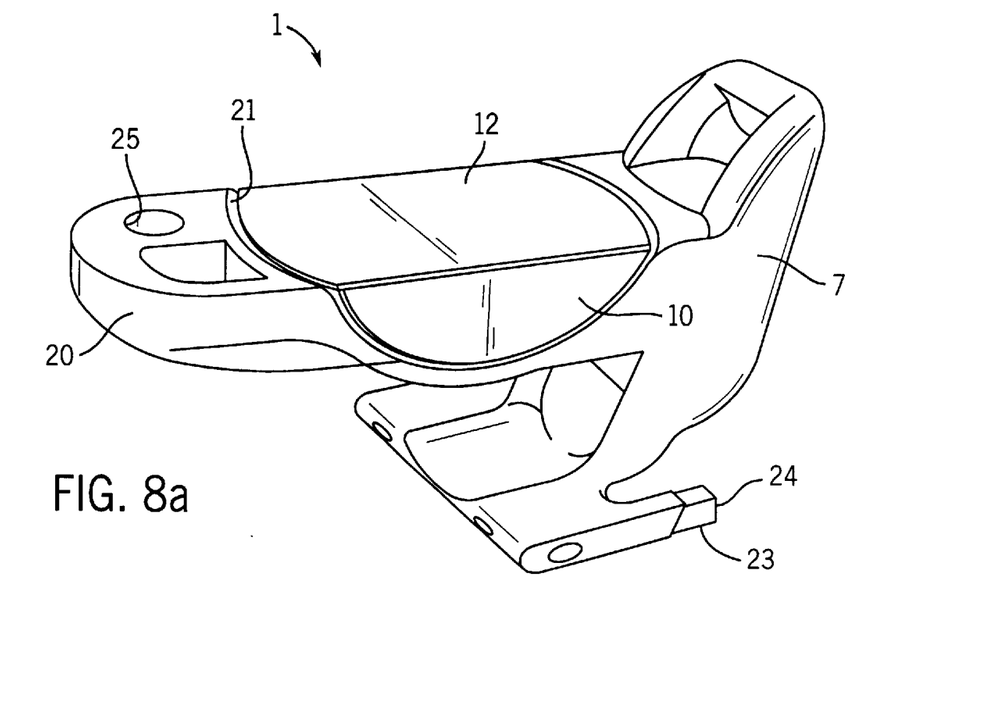
FIGS. 8a and 8b are perspective views of the folding seat part in accordance with a second preferred embodiment of the invention, shown in a retracted position and in an extended position.
Figure 8B:
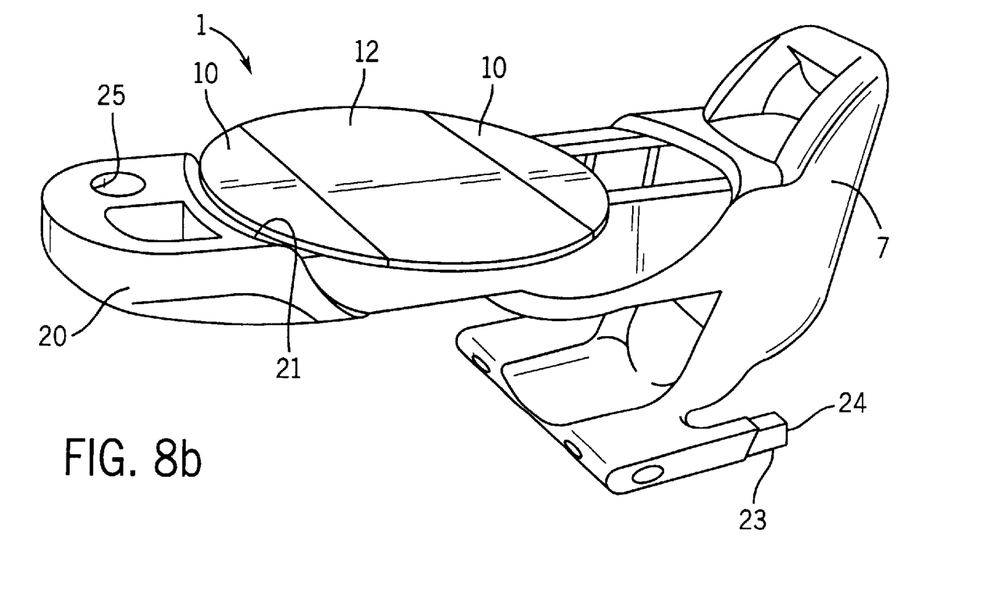
Figure 9:
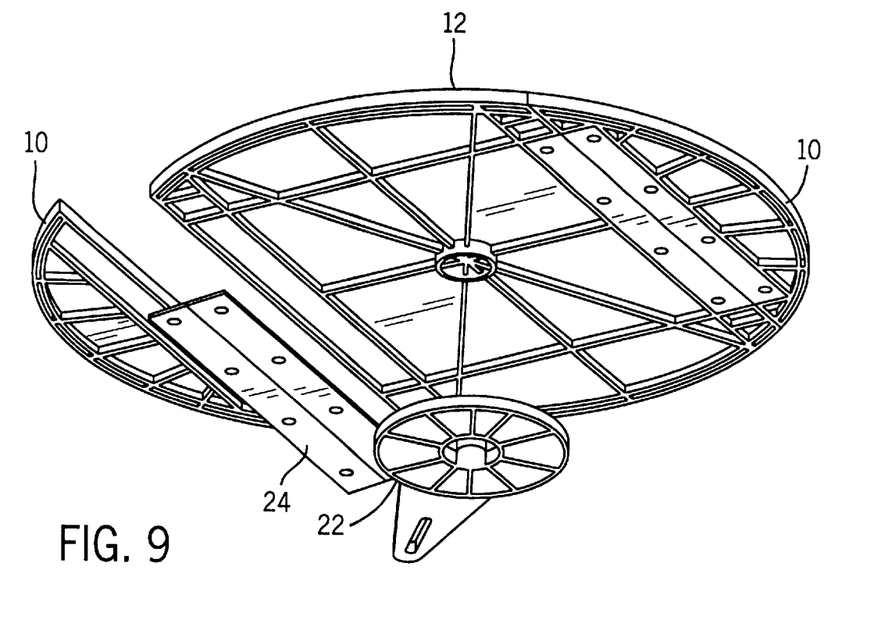
FIG. 9 is a bottom perspective view of the tabletop and swivel member in accordance with the second preferred embodiment of the invention.

As shown in FIGS. 8a and 8b, the folding seat part 1 in accordance with a second preferred embodiment of the invention includes a sliding member 20 with a handle 21. Unlike the handle 16 of the first preferred embodiment of the invention, the handle 21 allows movement of the tabletop from the retracted position (as shown in FIG. 8a) to the extended position (as shown in FIG. 8b) and rotational movement of the center leaf 12 with a corresponding movement of the side leafs 10. This dual function of the handle 21 is preferably accomplished by a swivel member 22, as shown in FIG. 9. The swivel member 22 translates the linear movement of the sliding member 20 into a rotational movement of the center leaf 12. The swivel member is preferably connected to both the base 7 and the center leaf 12. The folding seat part 1 may alternatively include other suitable devices to translate the linear movement of the sliding member 20 into a rotational movement of the tabletop.

As also shown in FIGS. 8a and 8b, the folding seat part 1 in accordance with a second preferred embodiment of the invention includes at least one mounting arm 23 extending from the base 7. The mounting arm 23 preferably includes a connector 24, which functions to fasten the folding seat part 1 to a corresponding connector (not shown) in a vehicle. The corresponding connector is preferably an ISOFIX connector, as developed by the Assignee of this invention, but may alternatively include other suitable devices to connect the folding seat part 1 to the vehicle. In this manner, the folding seat part 1 may be fastened within the vehicle and later removed to increase cargo room.

As shown in FIG. 9, the tabletop in accordance with a second preferred embodiment of the invention includes a living hinge 24 located between the center leaf 12 and the side leaf 10. The living hinge 24 is preferably made from a flexible plastic material, but may alternatively be made from other suitable materials. The flexible nature of the living hinge 24 allows for a hinge connection between the center leaf 12 and the side leaf 10 while increasing the aesthetics of the tabletop.

Figure 10:
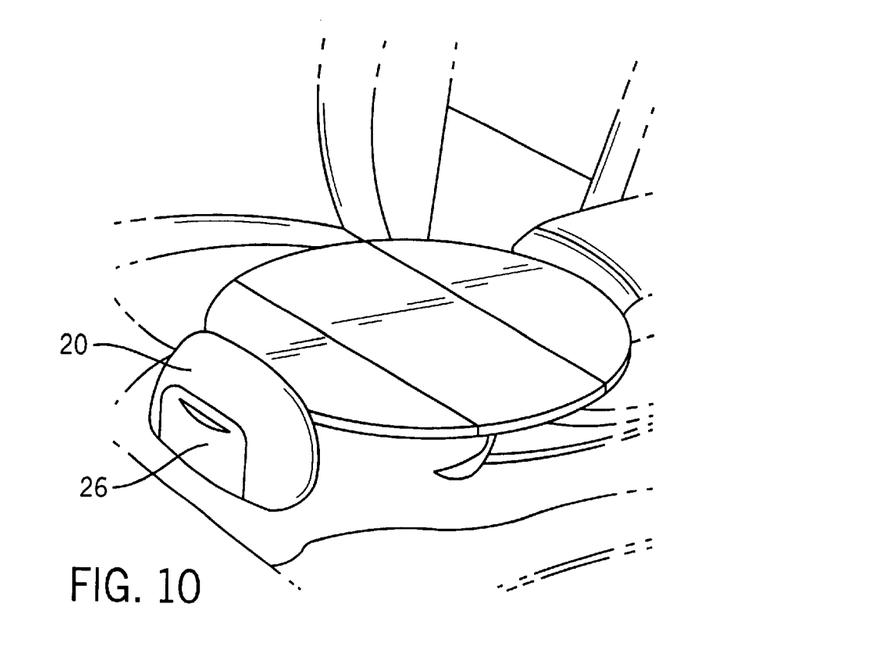
FIG. 10 is a perspective view of the sliding member in accordance with a further embodiment of the invention.

As shown in FIGS. 8a, 8b, and 10, the sliding member in accordance with a second preferred embodiment of the invention includes other features for the convenience of the occupants. These features may include exposed cupholders 25 (as shown in FIGS. 8a and 8b) and retractable cupholders 26 (as shown in FIG. 10). Other features, such as power sockets and small compartments may also be incorporated within the sliding member 20.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A folding seat part of a motor vehicle seat, comprising an integrated table with a base and a tabletop, said tabletop including a center leaf and at least one side leaf hinged to said center leaf, wherein said side leaf may be swung from a rest position against said base to a use position in a horizontal plane with said center leaf, said center leaf and said side leaf being mounted to said base for rotational movement about a vertical axis such that said rotational movement causes said side leaf to lock in a horizontal plane with said center leaf with said center leaf and said side leaf resting on said base.

2. The folding seat part of claim 1, wherein said folding seat part is an armrest for a rear seat bench of a motor vehicle.

3. The folding seat part of claim 1, wherein said tabletop includes two side leaves hinged to said center leaf.

4. The folding seat part of claim 1, wherein said tabletop is circular.

5. The folding seat part of claim 1, wherein said tabletop includes at least one recess for receiving containers.

6. The folding seat part of claim 1, wherein said base has the basic shape of a rectangular parallelepiped.

7. The folding seat part of the claim 1, wherein said base is designed as a hollow body and forms an accommodation space for receiving objects.

8. The folding seat part of claim 1, further comprising a covering for said base part movable relative to said base.

9. The folding seat part of the claim 1, further comprising a linear guide to accommodate sliding movement of said tabletop relative to said base.

10. The folding seat part of claim 1, wherein said tabletop includes a handle located on said center leaf.

11. The folding seat part of claim 1, wherein a width of said side leaf corresponds approximately to a height of said base.

12. The folding seat part of claim 1, further comprising a joint running between said center leaf and said side leaf, which rests on said base for approximately one third to one half of its length when said center leaf and said side leaf are in said locked position.

13. The folding seat part of claim 1, wherein said joint stands at an angle of approximately 45° relative to a longitudinal axis of said base.

14. The folding seat part of claim 1 further comprising a support for a seat bolster connected to said base.

15. The folding seat part of claim 1 further comprising a sliding member connected to said base for sliding movement between a retracted position and an extended position, said tabletop being mounted to said sliding member for rotational movement.

16. The folding seat part of claim 15 further comprising a swiveling means for rotating said tabletop and causing said side leaf to lock in the horizontal plane with said center leaf upon sliding movement of said sliding member from a retracted position to an extended position.

17. The folding seat part of claim 15 further comprising a swivel member connected to said center leaf and to said base, said swivel member being operable to translate sliding movement of said sliding member relative to said base into rotational movement of said tabletop.

18. The folding seat part of claim 15 wherein said sliding member includes a cupholder.

19. The folding seat part of claim 1 further comprising a mounting arm extending from said base and fastenable to a connector within the vehicle.

20. The folding seat part of claim 1 further comprising a living hinge connecting said center leaf and said side leaf.

* * * * *